Inventor:
Howard Diamond
By: Frost, Burmeister,
and Kulie
Attorneys

Feb. 11, 1969    H. DIAMOND    3,427,410
ELECTROMECHANICAL TRANSDUCER
Filed Oct. 8, 1964

Inventor:
Howard Diamond
By: Frost, Burmeister, and Kulie
Attorneys

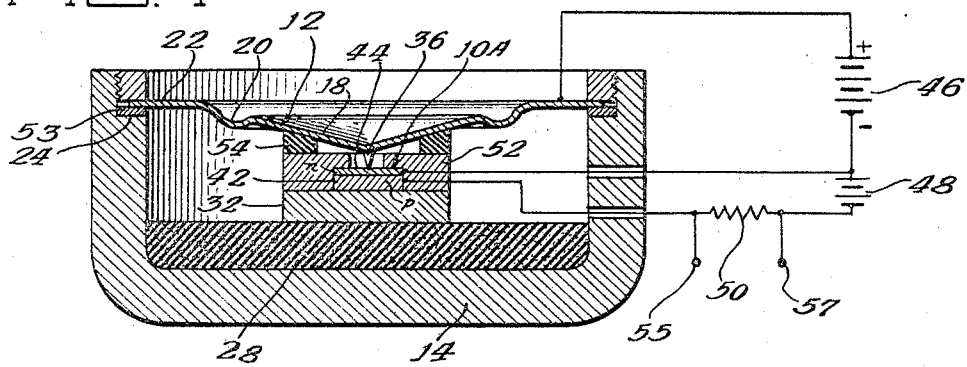
FIG. 4
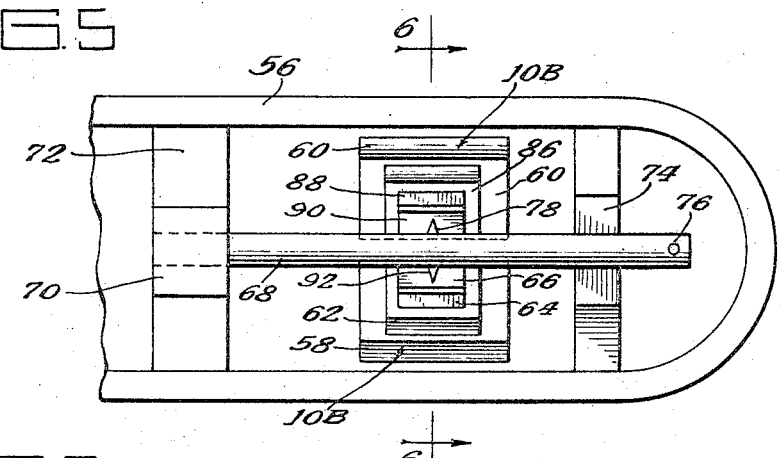
FIG. 5
FIG. 6
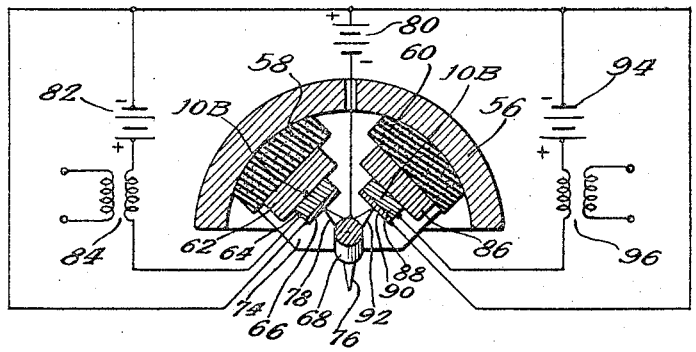
Inventor:
Howard Diamond

United States Patent Office 3,427,410
Patented Feb. 11, 1969

3,427,410
ELECTROMECHANICAL TRANSDUCER
Howard Diamond, Ann Arbor, Mich., assignor, by mesne assignments, to Electro-Voice, Incorporated, Buchanan, Mich., a corporation of Delaware
Filed Oct. 8, 1964, Ser. No. 402,500
U.S. Cl. 179—110                 10 Claims
Int. Cl. H04r 15/00

ABSTRACT OF THE DISCLOSURE

This application relates to transducers for generating electrical signals responsive to a force, and use of such transducers in microphones and phonograph pickups. In one embodiment, the transducer utilizes a thin slab of material of high resistivity which is disposed between an electrically conducting base and an electrical conductor. The electrically conducting base and electrical conductor are connected in a closed electrical circuit with a source of direct current and a load, and an electrical response is obtained in the form of a voltage drop across the load responsive to force exerted on the conductor to vary thep ressure between the conductor and the slab. In another embodiment, the transducer comprises a slab of semiconductor material in abutment with a layer of semiconductor material, the slab and layer being doped with impurities of opposite type. The slab and layer are reversed biased, and the layer is in abutment with a conductor which is forward biased with respect to the layer. The force to be responded to is impressed upon the conductor to vary the pressure between the conductor and the layer. In the preferred embodiments the conductor is provided with a spherical end in abutment with the layer.

---

The present invention relates generally to electromechanical tranducers, and particularly to electroacoustical transducers.

It has long been recognized that it is desirable for an electromechanical transducer to produce a relatively high output. A relatively high output reduces the need for amplification and hence reduces the cost of electronic equipment used in association with the transducer. A relatively large electrical output has been the principal advantage of carbon type microphones, whether of the double button or single button variety. However, such microphones failed to reproduce sound with fidelity, since they introduce a characteristic carbon hiss and possess limited frequency response.

Rochelle salt transducers have also been used for microphones and phonograph pickups because a relatively large electrical output can be obtained as a result of stressing a Rochelle salt crystal. Such transducers have been satisfactory over relatively narrow frequency ranges, but have suffered because of failure of the crystal after exposure to a humid atmosphere. Other type piezoelectric elements have also been used for microphones and phonograph pickups but these have not produced as great an output as the Rochelle salt crystal. Magnetic transducers, particularly the dynamic or moving coil type of transducer, have proven to be reliable, rugged and highly compliant which has made them suitable for use in microphones and phonograph pickups. These, however, have produced a very low electrical output compared to the piezoelectric devices and have required additional electrical amplification.

It is an object of the present invention to provide an electromechanical transducer which overcomes the objections and difficulties of the prior electromechanical transducers. This object of the invention requires an electromechanical transducer having an electrical output at least equal to that of the piezoelectric devices and which is capable of the fidelity of magnetic type transducers, is rugged, and relatively inexpensive to produce.

It has long been surmised that electromechanical transducers utilizing transistors could achieve this object of the invention. Efforts have been made to provide transistor microphones and transistor phonograph pickups by utilizing a light sensitive transistor and modulating the incident light on the transistor responsive to sound waves or record undulations. Also, efforts have been made to provide a pressure sensitive transistor suitable for use in phonograph pickups and microphones by placing a stylus in abutment with a junction of a junction type transistor. Such transistors have been difficult to fabricate in view of the necessity of precisely locating the tip of the stylus on the transistor junction. As a result, pressure transistors fabricated in this matter have been costly, fragile, and somewhat unreliable.

It is an object of the present invention to provide a pressure sensitive transistor which does not require location of a force transmitting element on a junction of the transistor. It is also an object of the present invention to provide a pressure sensitive transistor which may be produced more readily than pressure sensitive transistors known heretofore.

Further, it is an object of the present invention to provide a transistor microphone which may be simply produced, achieves high fidelity with high electrical output, has a relatively long life, and a wide frequency range of operation. It is also an object of the present invention to provide a phonograph pickup utilizing the transistor which has these characteristics.

These and further object of the present invention will be more fully appreciated from a further consideration of this disclosure, particularly when viewed in the light of the drawings, in which:

FIGURE 4 is a central sectional view of a microphone which constitutes another embodiment of the present invention, the electrical circuit being illustrated in the form of a schematic electrical circuit diagram;

FIGURE 5 is a plan view of the underside of a tone arm of a phonograph illustrating a stereophonic phonograph pickup constructed according to the teachings of the present invention;

FIGURE 6 is a sectional view taken along the lines 6—6 of FIGURE 5, FIGURE 6 also illustrating in schematic electrical circuit diagram the electrical circuit for the stereophonograph pickup.

Figure 1:
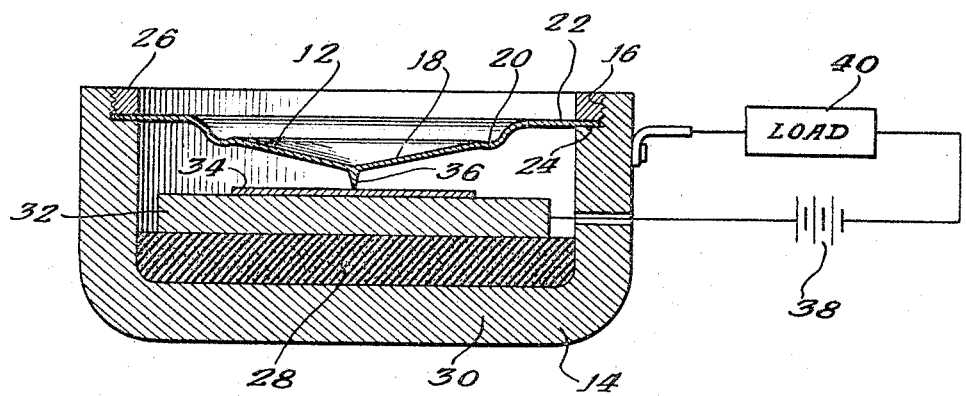
FIGURE 1 is a sectional view of a microphone constructed according to the teachings of the present invention.

It is to be understood that the invention is illustrated in terms of microphones and phonograph pickups, but it is applicable to all types of pressure transducers. The microphone of FIGURE 1 utilizes a pressure transducer 10 which is actuated by a diaphragm 12.

The microphone has a cup-shaped casing 14 which is provided with a circular recess 16 at the open end thereof. The diaphragm 12 has a cone shaped central portion which is circular in configuration and is surrounded by a plurality of circular corrugations 20 which form a compliant surround for the cone shaped central portion 18. A flat circular peripheral ring portion 22 surrounds the corrugated portion 20 and abuts a shoulder 24 formed by the circular recess 16 of the housing 14. The diaphragm 12 is constructed of electrically conducting material, such as aluminum or brass, and the cup-shaped housing 14 is also constructed of electrically conducting material, such as aluminum or brass. In this manner, the diaphragm 12 is electrically connected to the casing 14. A circular ring 26 is threaded on its outer periphery and engages threads in the circular recess 16 to wedge the circular portion 22 of the diaphragm between the shoulder 24 and the confronting surface thereof.

The housing has a flat circular member 28 disposed on the base 30 thereof. The member 28 is constructed of compliant material, such as sponge rubber or foam plastic. A flat electrically conducting plate 32 is disposed on the surface of the member 28 opposite the base 30 of the housing 14 in spaced insulated relationship to the housing 14. A thin film 34 of non-conducting material is disposed on the surface of the conducting plate 32 remote from the compliant member 28, and the surface of the film 34 remote from the plate 32 is in abutment with the tip of a protruding point 36, which may act as an electron or hole emitter, is disposed on the axis of the cone 18 and depending from the cone 18. The film 34 must have a thickness less than five microns.

The film 34 may be constructed of electrically insulating material, such as mica or other solid material which has a resistivity greater than $10^7$ ohm centimeters providing the film 34 is thin. The film 34 must be sufficiently thin to permit current carriers, that is electrons or holes, to pass therethrough without recombination. It has been found that a flat slab of mica with a thickness less than two microns, is satisfactory for the film 34, and one micron has been found particularly suitable. The point 36 which depends from the diaphragm 12 must be electrically conducting, but it is not critical as to materials. In one particular construction, the point 36 is fabricated of steel and has a 0.001 inch radius surface in contact with the film 34 of mica. The cross sectional area of the film 34 is not critical, and a mere chip or fragment of the material is satisfactory.

The plate 32 is electrically connected to a direct current power source 38, and the power source is connected in a series circuit with a load 40 and the diaphragm 12 by means of the electrically conducting casing 14. The load 40 may be either resistive or inductive, as will be more fully described hereinafter.

The following mode of operation of the microphone in FIGURE 1 is based upon experimental evidence and is not intended to be limiting. The point 36 of the diaphragm 12 introduces current carriers, either holes or electrons, into the film 34. If the film is an insulator, that is, has resistivity of $10^7$ ohm-centimeters or more, it is believed that a tunneling effect causes an electrical current to traverse the film 34, and the magnitude of this current has been found to be determined by the pressure of the point 36 on the film 34.

Figure 2:
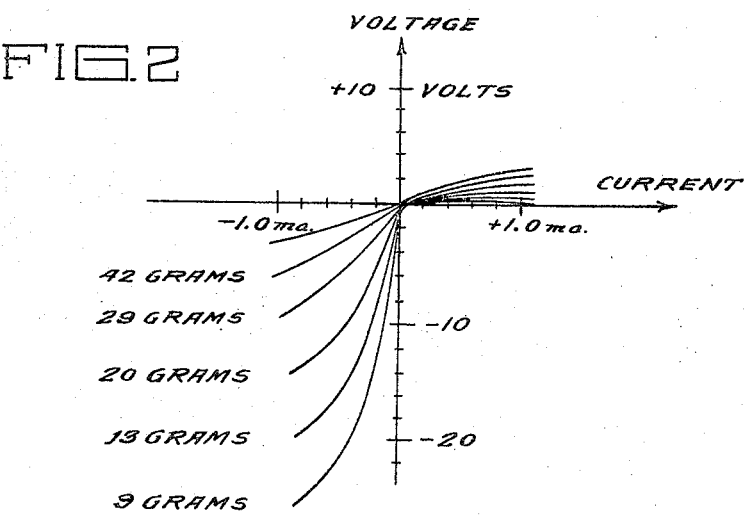
FIGURE 2 is a graph illustrating the relationship of current to voltage of the transducer of the microphone of FIGURE 1 for a plurality of different forces exerted on the pressure sensitive electromechanical element of the microphone.

The film 34 may also be a mass of semi-conductor material, that is, a solid member having a resistivity between $10^{-2}$ and $10^4$ ohm-centimeters. It has been found that silicon of the p-type, that is, of the type having a majority of positive current carriers, which contains impurities in the form of aluminum in a concentration of $10^{16}$ to $10^{17}$ atoms per cubic centimeter is satisfactory. Also, silicon of the n-type, that is, with a majority of negative current carriers, containing $10^{16}$ to $10^{17}$ atoms per cubic centimeter of arsenic has also proven most satisfactoryy. In addition to silicon, other semi-conductors such as germanium, cadmium, sulfide, gallium phosphide may also be used. FIGURE 2 illustrates the current to voltage relationship measured for a plurality of different pressures on a n-type chip of silicon with a doping of $10^{16}$ to $10^{17}$ atoms per cubic centimeter of aluminum.

FIGURE 4 illustrates a microphone which is an improved structure over that of FIGURE 1, and identical elements of the microphone of FIGURE 4 carry the same reference numerals as that of FIGURE 1. The microphone of FIGURE 4 differs from that of FIGURE 2 in that it utilizes a different electromechanical transducer 10A than that of FIGURE 1 and requires a different electrical circuit.

The electromechanical transducer 10A employs a p-type semi-conducting layer or slab 42 which has a surface in abutment with the electrically conducting plate 32. The thickness of the layer 42 is sufficiently small to permit the passage of current carriers without recombination. The surface of the semi-conductor slab 42 remote from the electrically conducting plate 32 has a thin film or layer 44 of n-type semi-conducting material formed thereon by diffusion of impurities or alloying. The thickness of the film or layer 44 is also sufficiently small to permit the passage of current carriers without recombination. The point 36 of the diaphragm 12 abuts the surface of the layer 44 remote from the semi-conducting slab 42 and exerts a pressure thereon.

Figure 3:
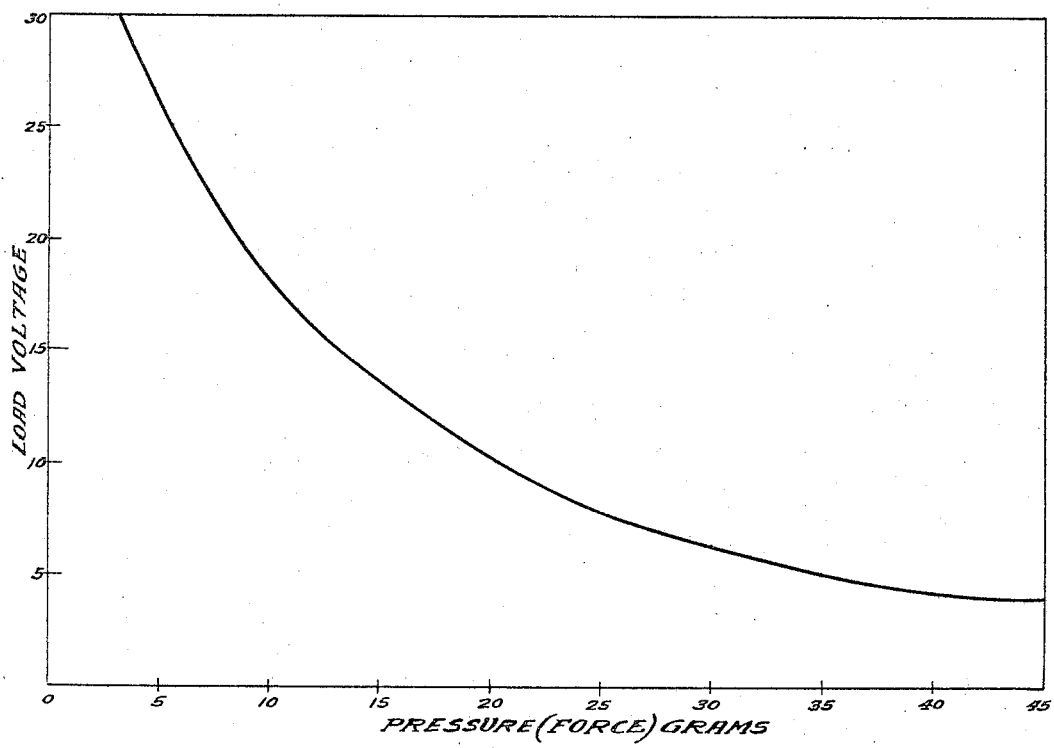
FIGURE 3 is a graph illustrating the relation between the voltage developed across the microphone of FIGURE 1 for different pressures exerted on the pressure sensitive electromechanical transducer thereof under conditions of constant current.

As in the previous embodiment, a direct current power source, illustrated as a battery 46, is electrically connected between the electrically conducting diaphragm 12 and the layer 44 of n-type semi-conducting material. The battery 46 places a forward bias on the junction formed between the point 36 of the diaphragm 12 and the n-type semi-conducting layer 44. Since the layer 44 contains a majority of electrons, it is the minority current carriers, or holes, that are injected into the semi-conducting layer 44 from the point 36. By reference to FIGURE 3, it can be seen that the greater the pressure of the point 36 on the layer 44, the greater will be the injection of holes into the layer 44.

The p-type semi-conducting slab 42 is reverse biased by by a direct current source in the form of a battery 48 which is connected between the layer 44 and the slab 42. A load impedance in the form of a resistor 50 is connected in series with the battery 48. Holes introduced into the layer 44 are thus swept through the semi-conducting slab 42, and result in a potential drop developing across the resistive load 50. In the manner of junction transistors, a relatively small variation in current produced by the pressure of the point 36 on the semi-conductive layer 44 results in a relatively large change in current through the resistor 50 and change in voltage across the resistor 50.

The microphone of FIGURE 4 may also be utilized with a p-type layer 44 and an n-type slab 42. The potential of the power source 46 must then be reversed to provide a bias injecting the minority current carrier (electrons) into the layer 44, and the power source 48 must also be reversed to provide reverse bias across the junction between the layer 44 and the slab 42.

Transistors deteriorate rapidly when subjected to the ambient atmosphere. Hence, it is necessary that all surfaces of the semi-conducting slab 42 and semi-conducting layer 44 be sealed from the ambient atmosphere. For this purpose, a mass 52 of solid non-compliant material is disposed about the perimeters of the slab 42 and layer 44, and the mass 52 is air impermeable to protect all surfaces of the slab 42 and layer 44 from the ambient atmosphere except the portion of the surface of the layer 44 immediately surrounding the point 36. The diaphragm 12 is air impermeable, and a compliant air impermeable ring 54 is sealed about the point 36 on both the surface of the diaphragm 12 and the confronting surface of the mass 52.

It is desirable that the point 36 be positioned in a rest position exerting a substantial force on the surface of the layer 44, and this force results from displacing the cone 18 against the resiliency of the corrugations 20. Precise mechanical biasing of the diaphragm 12 relative to the layer 44 is obtained by selection of the thickness of a ring 53 disposed on the shoulder 24 of the casing 14 in abutment with the peripheral portion 22 of the diaphragm 12. It is desirable that a force of approximately 3 grams be utilized as a bias.

The output of the microphone is taken from the resistor 50, and output terminals 55 and 57 have been provided for this purpose.

FIGURES 5 and 6 illustrate transducers 10B similar in construction to the transducers 10A but employing a p-type semi-conductor material in abutment with a point contact utilized in a stereophonograph reproducer. In FIGURES 5 and 6, a tone arm of a phonograph is illustrated at 56 and two electromechanical pressure sensitive transducers 10B are illustrated mounted on compliant pads 58 and 60 on the interior surface of the tone arm 56. The pads 58 and 60 are constructed of compliant material, such as sponge rubber or sponge foam plastic, in order to provide additional compliance for the phonograph pickup. The transducer 10B mounted on the pad 58 employs an electrically conducting plate 62 in abutment with the pad 58, an n-type slab 64 of semi-conducting material and a p-type layer 66 of semi-conducting material.

The phonograph pickup has a rigid drive arm 68 mounted on the tone arm 56 remote from the end thereof by means of a compliant grommet 70 which surrounds the tone arm 68 and is anchored in a yoke 72 integral with the tone arm 56. The drive arm 68 is disposed in a vertical plane parallel to the longitudinal axis of this portion of the tone arm 56 and tapers downwardly from the grommet 70. The drive arm 68 is supported by a pad 74 of compliant material near the end thereof opposite the grommet 70. A stylus 76 is mounted on the end of the tone arm 70 remote from the grommet 70 and is disposed in a vertical plane to engage the groove of a record. As a result of this construction, record undulations impressed upon the tone arm 68 through the stylus 76 oppose the force exerted by the compliant pad 74 and compliant grommet 70 and approximately equal compliance in all directions relative to the axis of the drive arm 68 is achieved.

The drive arm 68 is constructed of electrically conducting material, and a protruding point 78 extends from the stylus drive arm to engage perpendicularly the surface of the layer 66 of the electromechanical transducer 10B disposed upon the compliant pad 58. A direct current source 80 electrically connected between the drive arm 68 and the layer 66 provides a forward bias between the point 78 and layer 66 so that minority carriers, in this case electrons, are impressed from the drive arm 68 into the layer 66 and the quantity of current carriers thus impressed upon the layer 66 is determined by the pressure exerted between the point 78 and the layer 66, the greater the pressure the greater the number of current carriers injected into the layer 66. A second direct current source in the form of a battery 82 is electrically connected to reverse bias the junction between the layer 66 and the slab 64 in order to conduct minority carriers passing from the point 78 into the layer 66 through the slab 64 and the electrical circuit employing the battery 82. The primary winding of a transformer 84 is also connected in series with the battery 82, and the output of the phonograph pickup appears on secondary winding of the transformer 84. The turns ratio between the primary and secondary windings of the transformer 84 is utilized to provide an impedance match. It is to be noted that the transformer 84 may be substituted in the microphone of FIGURE 4 for the resistor 50, and the resistor 50 may be utilized in place of the transformer 84 in the phonograph pickup of FIGURES 5 and 6, these elements being but examples of suitable load impedances.

The phonograph pickup thus far described is suitable for monaural response, but FIGURES 5 and 6 illustrate a stereophonic phonograph pickup in which a second electromechanical transducer 10B is mounted on the pad 60. The second transducer 10B employs an electrically conducting plate 86 disposed on the pad 60, a semi-conducting slab 88 mounted on the plate 86, and a semiconducting layer 90 mounted on the slab 88, and a second point 92 mounted on the drive arm 68. These elements are identical to those described for the transducer 10B mounted on the pad 58. It is however necessary that the points 78 and 92 be disposed in planes traversing the longitudinal axis of the drive arm 68 perpendicularly to each other, and that the pad 66 be disposed in a plane perpendicular to pad 90. Further, the stylus 76 is disposed in a plane passing through the axis of elongation of the drive arm 68 and bisecting the angle between the planes of the points 78 and 92. The layer 90 is forward biased relative to the drive arm 68, and slab 88 is reverse biased relative to the layer 90 by a batery or other direct current source 94. A second transformer 96 is connected in series with the battery 94 and the output of the transducer 10B mounted on the pad 60 is taken from the secondary of the transformer 96.

It is to be noted that the phonograph pickup of FIGURES 5 and 6 employs semi-conductive elements which are not illustrated as sealed from the ambient atmosphere. It is, however, necessary to seal these elements in practice, and the sealing means has been omitted for purposes of clarity. The semi-conductive elements may be sealed from the ambient atmosphere in the manner set forth for the microphone of FIGURE 4, or the mechanism illustrated in connection with the microphone of FIGURE 7, to be described hereinafter, may also be employed.

Figure 7:
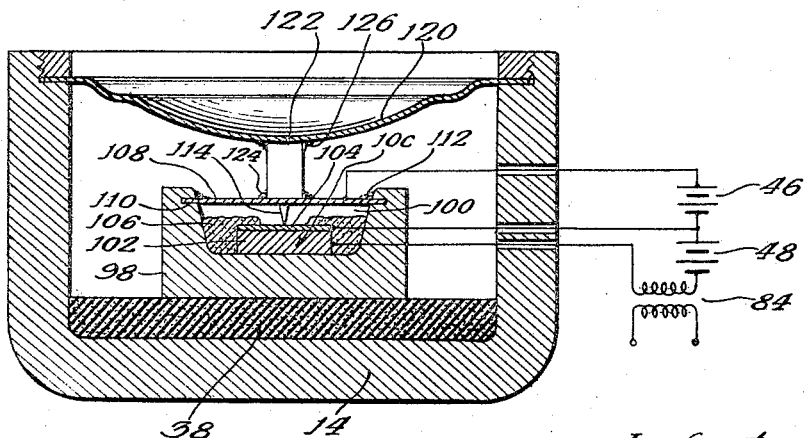
FIGURE 7 is a central sectional view of a microphone which constitutes still a further embodiment of the present invention.

The microphone of FIGURE 7 constitutes an improvement on the microphone of FIGURE 4, and identical parts have been labeled with the same reference numerals and will not be further described. In the embodiment of FIGURE 7, the electromechanical transducer 10C has a solid air impermeable housing 98 mounted on the compliant pad 38 at the base of the housing 14. The housing 98 has a central recess 100 confronting the open end of the casing 14, and a slab 102 of semi-conductive material is mounted against the surface of the recess 100. A film 104 is formed on the slab 102, and the entire assembly of slab 102 and film 104 are cemented into position by a mass of air impermeable cement 106 which extends from the slab and film to engage the surfaces of the recess of the housing 98. The mass 106, however, does not cover a portion of the film confronting the opening of the recess 100, this portion generally being disposed approximately centrally of the surface of the film 104. An electrically conducting compliant diaphragm 108 is sealed in a slot 110 adjacent to the mouth of the recess 100 by a mass 112 of cement, and the diaphragm 108 carries a point 114 on the surface thereof confronting the film 104, and the point 114 engages the surface of the film 104.

A diaphragm 120 is mounted on the casing 14 of the microphone at the mouth thereof, and the diaphragm 120 corresponds to the diaphragm 12. The diaphragm 120 need not be electrically conducting, but may be constructed solely from acoustical considerations. A drive arm 122 extends from the diaphragm 120 to normally engage the diaphragm 108, and the drive arm 122 is secured to the diaphragm 108 and to the diaphragm 120, as by layers of cement 124 and 126.

The electromechanical transducer 10C is similar in construction to that illustrated in FIGURE 4, except that the point 114 which engages the semi-conducting film is mounted on a separate diaphragm which is utilized to seal the semi-conductive film and slab from the ambient atmosphere, and is also utilized to provide an electrical connection to the point 114 which engages the film. The film and slab of semi-conductive materials may be either of the p or the n-type, and proper potentials must be applied thereto. In FIGURE 7, the direct current sources assume an n-type film 104 and a p-type slab 102.

Those skilled in the art will readily devise many modifications and many additional applications for electromechanical and electroacoustical transducers of the type set forth in this specification. For example, it is clear that the electromechanical pressure sensitive transducers may be utilized to measure all types of mechanical displacement including temperature produced displacement, vibrational amplitudes, shock amplitudes, accelerations, and the like. Further, modifications of the semi-conductor construction itself is contemplated within the spirit of the present invention, for example, pressure sensitive control of the majority carriers rather than the minority carriers as set forth in the examples above. It is therefore intended that the scope of the present invention be not limited by the foregoing disclosure, but rather by the appended claims.

The invention claimed is:

1. A transducer comprising a body of material having a resistivity at least equal to $10^7$ ohm centimeters and having a thickness of less than five microns, means defining an electrically conducting surface in contact with one side of the body, means for introducing current carriers into the body including an electrical conductor abutting the opposite side of the body and a direct current potential source electrically connected between the conductor and the conducting surface, and mechanical drive means for impressing a force to be responded to on the conductor to vary the pressure exerted by the conductor on the body responsive to said force.

2. A transducer comprising the combination of claim 1 wherein the body comprises a layer of mica having a thickness of the order of one micron.

3. A transducer comprising the combination of claim 1 wherein the end of the conductor abutting the body is provided with a point having a radius no greater than 0.001 inch.

4. A transducer comprising the combination of claim 3 wherein the conductor is constructed of steel.

5. A transducer comprising a body of semi-conducting material having a portion on one side thereof containing a preponderance of electrical current carriers of one polarity and a second portion adjacent to the first portion and on the other side of the body having a preponderance of current carriers of the opposite polarity, the thickness of the first portion of the body measured between the surface of the body and the second portion thereof being sufficiently small to permit the passage of current carriers without recombination and the thickness of the second portion measured between the first portion and the external surface thereof being sufficiently small to permit passage of current carriers without recombination, an electrically conducting surface disposed in contact with the external surface of the second portion of the body, an electrical conductor disposed in abutment with the external surface of the first portion of the body, a direct current potential source electrically connected between the electrical conductor and the first portion of the body polarized to inject into the first portion of the body current carriers of the opposite polarity as the majority of current carriers in the first portion of the body, a second direct current potential source electrically connected between the electrically conducting surface and the second portion of the body and polarized to attract to the second portion of the body current carriers of the same polarity as the majority of current carriers in the second portion of the body, a load element connected in series with the second potential source, and mechanical means for impressing a force to be responded to on the conductor to vary the pressure exerted by the conductor on the first portion of the body responsive to said force.

6. A transducer comprising the combination of claim 5 in combination with means for sealing the semi-conducting body from the ambient atmosphere including a compliant region sealed about the electrical conductor.

7. A microphone comprising the combination of claim 5 wherein the mechanical means for impressing a force on the conductor includes a diaphragm mechanically coupled to the conductor.

8. A microphone comprising the combination of claim 7 wherein the conductor is provided with a spherical end in abutment with the first portion of the semi-conductor body with a radius no greater than 0.001 inch.

9. A phonograph pickup comprising the combination of claim 5 wherein the mechanical means for impressing a force on the conductor includes a drive arm pivotally mounted at one end and a stylus mounted at the other end.

10. A phonograph pickup comprising the combination of claim 9 wherein the conductor is mounted on the drive arm between the pivot end and the stylus and is provided with a spherical end in abutment with the first portion of the semiconductor body with a radius no greater than 0.001 inch.

References Cited

UNITED STATES PATENTS

| 3,182,492 | 5/1965 | Sikorski | 73—88.5 |
| 3,215,787 | 11/1965 | Hill | 179—110 |
| 3,295,085 | 12/1966 | Nelson | 317—235 |

OTHER REFERENCES

Experimental Tunnel-Diode Electromechanical Transducer Elements and Their Use in Tunnel-Diode Microphones by Edward S. Rogers, The Journal of the Acoustical Society of America, vol. 34, No. 7, July 1962, pp. 883–893.

WILLIAM C. COOPER, *Primary Examiner.*

A. A. McGILL, *Assistant Examiner.*

U.S. Cl. X.R.

317—235